Jan. 31, 1950     A. F. MOORE     2,496,129

SUN VISOR

Filed Dec. 7, 1944

INVENTOR.
Alvin F. Moore
BY Parker & Burton
attorneys

Patented Jan. 31, 1950

2,496,129

UNITED STATES PATENT OFFICE 2,496,129

SUN VISOR

Alvin F. Moore, Monroe, Mich., assignor to Woodall Industries Incorporated, Detroit, Mich., a corporation of Michigan Application December 7, 1944, Serial No. 566,981

2 Claims. (Cl. 248—278)

This invention relates to an improved sun visor assembly designed particularly for use in vehicle bodies such as closed automobile bodies.

An object is to provide improved sun visor mechanism adapted to be supported within an automobile body adjacent to the windshield window opening and to a side window opening and wherein the visor blade is adjustable to a plurality of relatively angular positions before and substantially parallel to either window opening, and is adjustable to a position above or overlapping either window opening and is adjustable from a position overlapping either window opening to a position overlapping the other window opening.

A further object is to provide a visor assembly which includes a bracket base adapted to be fixed to the interior of an automobile body adjacent to the windshield window opening and adjacent to a side window opening, a rod support pivoted to the base for rotatable adjustment relative to the base about an upright axis, an angular hanger rod having one end journaled upon the rod support for swinging movement of the rod about a horizontal axis, and a visor blade pivotally mounted upon the opposite end of the rod for rotatable adjustment thereabout. The visor blade is also adjustable longitudinally along the rod according to the disclosure of Pelcher Patent No. 2,294,317 of the assignee of this application.

More particularly the visor blade is rotatable about the supporting rod from a position above either window opening to a position overlapping such window opening and vice versa. The visor blade and rod are rotatably adjustable about the axis of rotation of the rod upon the rod support to a plurality of relatively angular positions of the blade before and substantially parallel to either window opening. The visor blade, rod, and rod support are pivotally adjustable about the axis of rotation of the rod support upon the base from a position overlapping either window opening to a position overlapping the other window opening.

Other objects, advantages and meritorious features of the invention will more fully appear from the following description, appended claims and accompanying drawings wherein:

Figure 1:
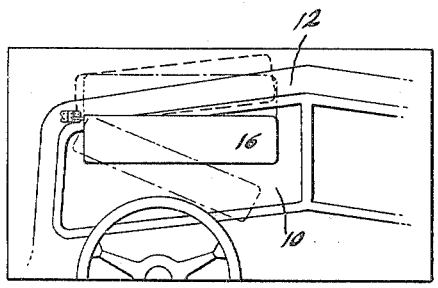
Figure 1 is an elevation of the interior of a front corner of an automobile body showing this improved visor assembly in place therein.

In the interior views of the automobile body shown in the drawings let 10 indicate a portion of the windshield window opening and 12 indicate the header thereabove. The side window opening is indicated by the numeral 14. This improved visor assembly is mounted upon a bracket secured in place adjacent to and between these two window openings.

The visor assembly includes a visor blade 16 which is journaled upon a supporting rod 18 for rotatable adjustment thereabout to a position either above or overlapping either window opening. The visor blade and its mounting upon the rod may be of the character shown in Pelcher Patent No. 2,294,317 in which a metal strip 19 is secured along one linear margin to the foundation panel 17 of the blade. This metal strip is rolled over at its ends to provide tubular portions 20 which are journaled upon the rod 18. These tubular portions 20 are so received upon the rod as to be slidable thereover lengthwise of the rod as well as rotatably about the rod.

The metal strip is cut away between the end portions 20 and within this space there is mounted upon the rod a gripping member 24 which member is adapted to so embrace the rod as to be resistingly rotatable thereabout to maintain any position of rotatable adjustment about the rod. This gripping member has a radially extending wing 26 which wing is slidable frictionally between the plate 19 and the foundation 17 of the visor blade to permit the visor blade being moved to adjusted positions lengthwise along the rod and to maintain the blade at such positions of adjustment. The member 24 is not readily slidable lengthwise along the rod but is rotatable thereabout as above set forth. The adjustment of the visor blade lengthwise of the rod is therefore limited to the clearance provided between the opposite ends of the cutout opening in the strip 19 and the member 24.

The visor bracket includes a base plate 30 which is fixed to the body as by screws 32. This bracket has a cup-shaped part 34 fixed thereto.

A rod supporting plate 36 is rotatably mounted upon one end of the part 34 by a pin 38. One end of the pin is threaded into the plate 36 and the opposite end of the pin carries a nut 40. A spring 42 is interposed between the nut and the bottom of the interior of the cup-shaped part 34 to exert an upward tension holding the plate 36 against the end of the part 34 and seated within an end recess 44 thereof as shown in Figure 5.

Figure 4:
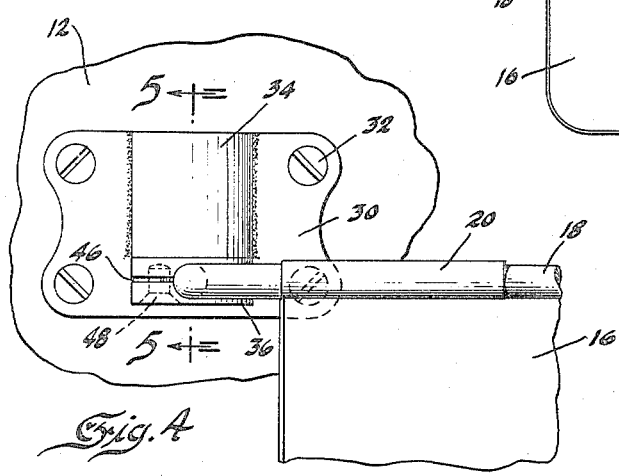
Figure 4 is a fragmentary elevation of the supporting bracket partly in section.
Figure 3:
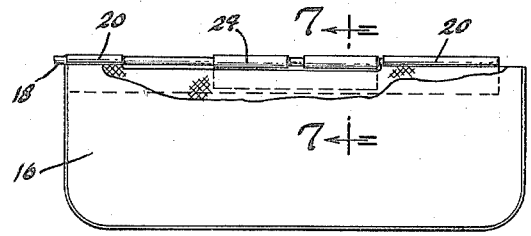
Figure 3 is an elevation partly broken away of the visor blade mounted upon the supporting rod.
Figure 7:
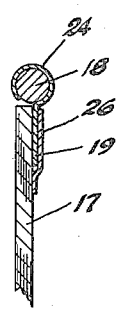
Figure 7 is a vertical sectional view taken on the line 7—7 of Figure 3.
Figures 5, 6:
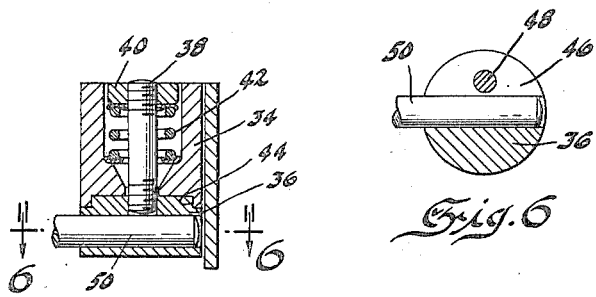
Figure 5 is a vertical sectional view taken on the line 5—5 of Figure 4.
Figure 6 is a horizontal sectional view taken on the line 6—6 of Figure 5.

The plate 36 is divided as by a saw kerf 46 and the two wings formed by the kerf are held toward each other by an adjustment screw 48 as shown in Figures 4 and 6. The saw kerf terminates in a diametrically disposed opening adapted to receive the end 50 of the rod 18 as shown in Figure 5 and 6. The screw 48 can be adjusted to cause the plate to grip the end portion 50 of the rod so as to frictionally maintain the rod at adjusted positions of rotation within the plate.

Figure 2:
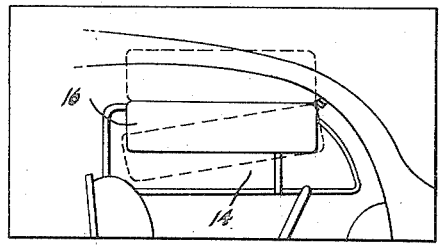
Figure 2 is an elevation of the same interior front corner shown in Figure 1 but taken on an angle of 90° with respect to the view of Figure 1.

It will now be apparent that the visor blade can be adjusted lengthwise along the rod 18 before either window opening and parallel thereto. The blade can also be adjusted rotatably about the rod 18 to a position before either window opening or to a position thereabove. The blade and rod can be adjusted about the horizontal axis of rotation of the end 50 of the rod within the plate 36 to a plurality of angular positions of the blade before either window opening and in parallelism therewith as shown in Figures 1 and 2. The blade, rod, and plate 36 may be rotatably adjusted about the upright axis of rotation of the plate with respect to the bracket to position the visor blade before either window opening as shown in Figures 1 and 2.

What I claim is:

1. In sun visor mechanism for use in a vehicle body having a windshield window opening and a side window opening an upright cup shaped bracket base, a rod support pivoted upon the outer face of the bottom of the base by an upright pin extending through the bottom of the base for rotation thereabout over said outer face, a spring within the cup shaped base acting upon said pin holding the rod support yieldingly against the bottom of the base to maintain adjusted positions of rotation thereover, an angular hanger rod journaled at one end upon the rod support for rotation about a substantially horizontal axis, said rod support being in the form of a horizontally split horizontally disposed plate having a bearing for the hanger rod between its split portions and means holding said split portions to grip the rod to maintain adjusted positions of rotation therebetween, and a visor blade pivotally mounted upon the opposite end portion of the rod for rotatable adjustment thereabout.

2. Sun visor mechanism comprising, in combination, an upright bracket base provided with a recess extending downwardly thereinto from the top and a recess circular in cross-section extending upwardly thereinto from the bottom, said top recess being of substantially greater depth than the bottom recess, a coil spring seated within the top recess, a pin extending downwardly through said spring and through the bottom of the top recess into the bottom recess, said pin having a head surmounting the spring, a disc-shaped plate split horizontally providing upper and lower sections, a circular boss formed on the upper section journalled within the bottom recess of the bracket base, said plate mounted upon the pin and held upwardly by the pin and spring within the bottom recess of the bracket base for rotation therein and adapted to frictionally maintain positions to which rotated, said plate exhibiting a rod supporting bearing between its upper and lower sections intersecting the axis of rotation of the plate, an angular hanger rod having one leg mounted within the bearing between said sections, means connecting the upper and lower sections of the plate together gripping the rod therebetween to frictionally maintain it at adjusted positions of rotation between the sections and a visor blade mounted upon said rod.

ALVIN F. MOORE.

REFERENCES CITED

The following references are of record in the file of this patent:

UNITED STATES PATENTS

| Number | Name | Date |
|---|---|---|
| 1,590,203 | Olssen et al. | June 29, 1926 |
| 1,680,560 | McDonald | Aug. 14, 1928 |
| 1,941,032 | Knowles | Dec. 26, 1933 |
| 2,057,009 | Chadwick | Oct. 13, 1936 |
| 2,220,429 | Soderberg | Nov. 5, 1940 |
| 2,294,317 | Pelcher et al. | Aug. 25, 1942 |
| 2,299,280 | Reed | Oct. 20, 1942 |
| 2,305,584 | Arbron | Dec. 22, 1942 |